Figure 1:
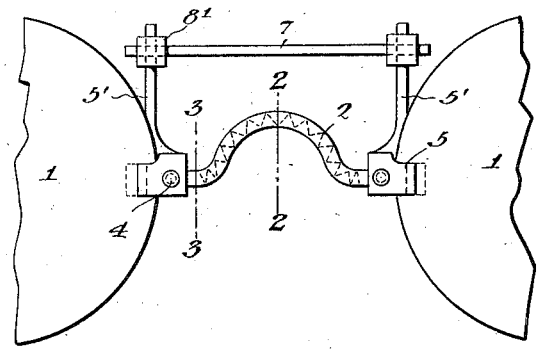

F. PELS-LEUSDEN.
EYEGLASSES.
APPLICATION FILED APR. 6, 1912.

1,083,700.

Patented Jan. 6, 1914.

Witnesses:

Inventor:
FRIEDRICH PELS-LEUSDEN
By
Attorneys

UNITED STATES PATENT OFFICE.

FRIEDRICH PELS-LEUSDEN, OF BERLIN, GERMANY.

EYEGLASSES.

1,083,700.  Specification of Letters Patent.  Patented Jan. 6, 1914.

Application filed April 6, 1912. Serial No. 688,860.

*To all whom it may concern:*

Be it known that I, FRIEDRICH PELS-LEUSDEN, a subject of the German Emperor, residing at Berlin, Germany, have invented certain new and useful Improvements in Eyeglasses, of which the following is a specification.

My invention relates to eyeglasses and has for its object to provide a new and improved form of nose bridge capable of being easily and quickly conformed to an individual nose and, when so conformed, of being rigidly fixed in such conformation so as not to be readily thereafter distorted therefrom.

While I have entitled and am about to describe my invention as applied to eyeglasses the same is equally useful and applicable to spectacles and I intend the claims to cover the invention thus broadly.

My invention will be best understood by referring to the drawings accompanying in which—

Figure 2:
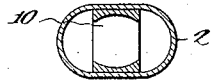
Figure 3:
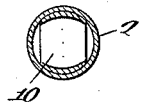
Figure 4:
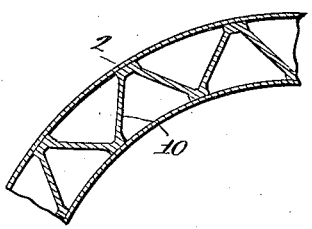

Figure 1 represents a front elevation of an eyeglass embodying a preferred form of my invention, the lenses being shown as partially broken away; Fig. 2 represents a section taken along the line 2—2 of Fig. 1; Fig. 3 represents a section taken along the line 3—3 of Fig. 1; and Fig. 4 represents a central longitudinal section of a part of the nose bridge taken in the plane thereof.

Referring to the drawings the lenses 1 are connected together by a bridge 2, each end of which is provided with a lug 3 of thickness substantially equal to that of the lens at the point where said lens is to be supported. The outer edge or side of this lug is shaped to conform to the shape of the lens edge and the lug itself is bored through to receive a screw 4 by means of which a structure provided with two resilient ears 5 and an upright 5' is attached to the lug so that the ears extend over and embrace the lens; thus lug, ears and lens are held in close juxtaposition. To enable the ears 5 to tightly grip the lens each ear is provided with an inwardly projecting tongue 6 which engages corresponding slots previously ground into the lens from each side thereof. These slots (and of course the tongues 6) are preferably segments of a circle in which case they are readily formed in the lens by the use of a suitable carborundum or other grinding wheel; other forms of slot and tongues 6 may, however, be employed, for instance slots tapering inward.

The above described rim or lens clamping means forms no part of my present invention but constitutes the subject matter of a separate copending application, Serial No. 728,382, filed October 29, 1912.

The two uprights 5' carry an upper bridge 7 to which are attached clamp arms carrying clamping plates especially with lenses of different thickness (not shown) adapted to clamp the nose at the inner canthi of the eyes. This special arrangement of upper bridge, clamp arms and clamping plates forms no part of my present invention but constitutes the subject matter of a separate copending application, Serial No. 659,502, filed November 10, 1911.

In the figures the upper bridge 7 is slidably held in sleeves 8 which are each provided with an inner extension 8' having a vertical bore being thereby adapted to slip over an upright 5' and be vertically slidable thereupon.

Referring to the lower bridge 2, this is made from a suitably bent thin walled metal tube, preferably flattened in its central region, in the entire length of which has been inserted a thin and resilient metal strip 10 previously bent in zigzag fashion so as to embody a continuous series of V's; the size of these V's is so determined than when the strip 10 is in position within the tube of the bridge, the points of the V's will contact with the inner wall of the tube. Before inserting the V-shaped strip 10 into the tube of the bridge both the inner wall of said tube and the points of the V's are to be coated with a suitable solder preferably a quick melting solder. In the just described condition the bridge 2, as a whole, may be easily bent to suit the contour of an individual nose and the eyeglasses thus perfectly fitted to a given individual, the upper bridge 7 being permitted to shorten or lengthen in the sleeves 8 and to be raised or lowered upon the upright 5' as the shape of the bridge 2 is altered to conform to such change of shape and to the facial characteristics of the individual being fitted. When the length and height of the upper bridge is satisfactorily determined it is permanently fixed in position by setting up the two pressure screws 11. The lower bridge, having its inner strip 10 inserted in its tube, and both tube and strip being prepared with solder as above described, and the bridge having been bent to conform to the nose of the individual being fitted, the bridge is now suitably heated so as to cause the solder, at the points of contact of the V's with the inner tube wall, to melt. Upon cooling the strip and tube will be found firmly soldered together and the bridge as a whole stiff and unbendable.

The heating, to solder bridge tube and strip together, may be conveniently done, if desired, by making the bridge part of a suitable electric circuit. Instead of soldering the bridge tube and its inner strip together, as just described, they may, by suitably performing the heating operation, be welded together. The bridge tube can be shaped in any suitable way and may also be slotted longitudinally, or be divided, to facilitate bending.

In fitting the lower bridge 2 to an individual nose, as above described, it may, and probably will be, necessary to vary and adjust the plane of the bridge with reference to the plane of the lenses. This is easily accomplished in the several constructions shown since the bridge end, in every form, fits over a cylindrical teat 13 upon which it may be rotated until the proper adjustment is obtained. By coating the surface of the teat and the inner surface of the bridge end with solder the same heating which fixes the final form of the bridge proper will also solder it fast to the aforesaid teats and thus adjust it permanently with reference to the lenses. This teat may be formed directly upon the lug 3; or otherwise suitably related to the structural part of the mounting.

The combined tube and internal strip structure which I have above described may, quite obviously, be used for other purposes than the construction of eyeglass bridges and such use I wish to be considered as included within the scope of my invention.

Having described my invention, I claim:

1. An eyeglass having, in combination, a pair of lenses and a bridge connecting said lenses, said bridge comprising an easily bendable hollow body and a V-shaped strip within said body, the points of the V's being in contact with the inner walls of the hollow body, and the hollow body and strip being adapted to be soldered together after having been shaped to the nose.

2. An eyeglass having, in combination, a pair of lenses and a bridge connecting said lenses, said bridge comprising an easily bendable hollow body and a V-shaped strip within said body, the points of the V's being in contact with the inner walls of the hollow body, and coated with solder, the hollow body and strip being adapted to be firmly united by applying heat after having been shaped to the nose.

3. As an article of manufacture, an eyeglass bridge comprising an easily bendable hollow body and a V-shaped strip within said body, the points of the V's being in contact with the inner walls of the hollow body, and the hollow body and strip being adapted to be soldered together after having been shaped to the nose.

4. As an article of manufacture, an eyeglass bridge comprising an easily bendable hollow body and a resilient strip within said body provided with V's having their points coated with solder and in contact with the inner walls of the hollow body, the hollow body and strip being adapted to be firmly united by applying heat after having been shaped to the nose.

5. As an article of manufacture, a compound body comprising a tube and a resilient V-shaped strip within said body, the points of said V's being in contact with the inner walls of said body and firmly united thereto.

In testimony whereof I have hereunto set my hand in the presence of two subscribing witnesses.

FRIEDRICH PELS-LEUSDEN.

Witnesses:
WOLDEMAR HAUPT,
HENRY HASPER.

Copies of this patent may be obtained for five cents each, by addressing the "Commissioner of Patents, Washington, D. C."